United States Patent
Bayer et al.

(10) Patent No.: US 10,252,238 B2
(45) Date of Patent: Apr. 9, 2019

(54) APPARATUS FOR PRODUCING PULVERULENT POLY(METH)ACRYLATE

(71) Applicant: BASF SE, Ludwigshafen (DE)

(72) Inventors: Robert Bayer, Sinsheim (DE); Jürgen Freiberg, Lampertheim (DE); Rudolf Schliwa, Alzenau (DE); Marco Krüger, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/554,436

(22) PCT Filed: Feb. 25, 2016

(86) PCT No.: PCT/EP2016/053954
§ 371 (c)(1),
(2) Date: Aug. 30, 2017

(87) PCT Pub. No.: WO2016/139116
PCT Pub. Date: Sep. 9, 2016

(65) Prior Publication Data
US 2018/0065102 A1    Mar. 8, 2018

(30) Foreign Application Priority Data
Mar. 2, 2015   (EP) .................................... 15157146

(51) Int. Cl.
*B01J 8/12* (2006.01)
*C08F 2/01* (2006.01)
(Continued)

(52) U.S. Cl.
CPC .............. *B01J 8/125* (2013.01); *B01J 4/001* (2013.01); *B01J 4/005* (2013.01); *B01J 8/087* (2013.01);
(Continued)

(58) Field of Classification Search
CPC ... B01J 8/40; B01J 8/245; B01J 8/1836; B01J 8/087; B01J 8/16; B01J 2208/00203;
(Continued)

(56) References Cited

U.S. PATENT DOCUMENTS 7,988,927 B2 * 8/2011 Lehr ........................ B01J 8/067
                                                            165/104.21
8,450,428 B2 * 5/2013 Daniel .................... A61L 15/60
                                                            525/329.5

FOREIGN PATENT DOCUMENTS

EP          2550306 B1      7/2014

OTHER PUBLICATIONS

International Search Report, International Application No. PCT/EP2016/053954, dated May 2, 2016.

* cited by examiner

*Primary Examiner* — Lessanework Seifu
(74) *Attorney, Agent, or Firm* — Marshall, Gerstein & Borun LLP

(57) ABSTRACT

An apparatus for producing pulverulent poly(meth)acrylate in a reactor for droplet polymerization having an apparatus for dropletization of a monomer solution for the production of the poly(meth)acrylate having holes through which the monomer solution is introduced, an addition point for a gas above the apparatus for dropletization, at least one gas withdrawal point on the circumference of the reactor and a fluidized bed, and above the gas withdrawal point the reactor has a region having a constant hydraulic internal diameter and below the gas withdrawal point the reactor has a hydraulic internal diameter that steadily decreases. The reactor has a heating means in the region having a steadily decreasing hydraulic internal diameter.

10 Claims, 2 Drawing Sheets

(51) Int. Cl.
*B01J 8/08* (2006.01)
*B01J 4/00* (2006.01)
*C08F 120/06* (2006.01)

(52) U.S. Cl.
CPC .................. *B01J 8/12* (2013.01); *C08F 2/01* (2013.01); *C08F 120/06* (2013.01); *B01J 2208/00203* (2013.01); *B01J 2208/00389* (2013.01); *B01J 2208/00415* (2013.01); *B01J 2219/00083* (2013.01); *B01J 2219/00132* (2013.01); *B01J 2219/00135* (2013.01); *B01J 2219/00254* (2013.01); *B01J 2219/185* (2013.01); *B01J 2219/1943* (2013.01); *B01J 2219/1946* (2013.01)

(58) Field of Classification Search
CPC ...... B01J 2208/00415; B01J 2219/0009; B01J 2219/00135; B01J 2219/1946; B01J 2219/1943; B01J 2219/185; C08F 2/01
See application file for complete search history.

APPARATUS FOR PRODUCING PULVERULENT POLY(METH)ACRYLATE

CROSS-REFERENCE TO RELATED APPLICATIONS

This application is the U.S. National Stage application of International Patent Application No. PCT/EP2016/053954, filed Feb. 25, 2016, which claims the benefit of European Patent Application No. 15157146.0, filed Mar. 2, 2015.

The invention proceeds from an apparatus for producing pulverulent poly(meth)acrylate, comprising a reactor for droplet polymerization comprising an apparatus for dropletization of a monomer solution for the production of the poly(meth)acrylate comprising holes through which the monomer solution is introduced, an addition point for a gas above the apparatus for dropletization, at least one gas withdrawal point on the circumference of the reactor and a fluidized bed, wherein above the gas withdrawal point the reactor comprises a region having a constant hydraulic internal diameter and below the gas withdrawal point the reactor has a hydraulic internal diameter that steadily decreases.

Poly(meth)acrylates are employed, in particular, as water-absorbing polymers used in the production of diapers, tampons, sanitary napkins and other hygiene articles for example, and also as water-retaining agents in market gardening.

The properties of the water-absorbing polymers may be altered via the level of crosslinking. As the level of crosslinking increases, gel strength increases and absorption capacity decreases. This means that as absorption under pressure increases, centrifuge retention capacity decreases while at very high levels of crosslinking, absorption under pressure also decreases again.

To improve performance properties, for example liquid conductivity in the diaper and absorption under pressure, water-absorbing polymer particles are generally post crosslinked. This increases only the level of crosslinking at the particle surface, which makes it possible to decouple absorption under pressure and centrifuge retention capacity at least to an extent. This post crosslinking can be performed in an aqueous gel phase. Generally, however, ground and sieved polymer particles are surface coated with a post crosslinker, thermally post crosslinked and dried. Crosslinkers suitable for this purpose are compounds comprising at least two groups which can form covalent bonds with the carboxylate groups of the hydrophilic polymer.

Different processes are known for producing the water-absorbing polymer particles. For instance, the monomers and any additives used for producing poly(meth)acrylates may be added to a mixing kneader in which the monomers react to afford the polymer. Rotating shafts with kneading bars in the mixing kneader break up into chunks the polymer being formed. The polymer withdrawn from the kneader is dried and ground and sent for further processing. In an alternative version the monomer is introduced into a reactor for droplet polymerization as a monomer solution which may also comprise further additives. The monomer solution breaks up into droplets upon introduction into the reactor. The mechanism of droplet formation may be turbulent or laminar jet breakup, or else dropletization. The mechanism of droplet formation depends on the entry conditions and the properties of the monomer solution. The droplets fall downward in the reactor, in the course of which the monomer reacts to afford the polymer. In the lower region of the reactor there is a fluidized bed into which the polymer particles being formed from the droplets by the reaction fall. A post reaction then takes place in the fluidized bed. Such processes are described, for example, in WO-A 2006/079631, WO-A 2008/086976, WO-A 2007/031441, WO-A 2008/040715, WO-A 2010/003855 and WO-A 2011/026876.

The disadvantage of all processes which are based on the principle of spray drying and where monomer solution breaks up into droplets and falls downward in a reactor to form the polymer is that droplets can coalesce upon collision and droplets hitting the wall of the reactor can adhere and thus result in unwanted fouling.

It is accordingly an object of the present invention to provide an apparatus for producing pulverulent poly(meth)acrylate which comprises a reactor for droplet polymerization and where fouling of the wall of the reactor is avoided or at least sharply reduced.

This object is achieved by an apparatus for producing pulverulent poly(meth)acrylate, comprising a reactor for droplet polymerization comprising an apparatus for dropletization of a monomer solution for the production of the poly(meth)acrylate comprising holes through which the monomer solution is introduced, an addition point for a gas above the apparatus for dropletization, at least one gas withdrawal point on the circumference of the reactor and a fluidized bed, wherein above the gas withdrawal point the reactor comprises a region having a constant hydraulic internal diameter and below the gas withdrawal point the reactor has a hydraulic internal diameter that steadily decreases, wherein the reactor comprises a heating means in the region having a steadily decreasing hydraulic internal diameter.

In the production of poly(meth)acrylates in a reactor for droplet polymerization it has been found that encrustations inside the reactor occur essentially in the lower region and particularly in the section in which the hydraulic internal diameter of the reactor decreases. It has been found that, surprisingly, fouling may be largely avoided by heating the reactor in the region of the reactor having a decreasing hydraulic internal diameter.

The hydraulic diameter $d_h$ is defined as:

$$d_h = 4 \cdot A/C$$

where A is area and C is circumference. Using the hydraulic diameter renders the configuration of the reactor independent of the shape of the cross-sectional area. This area may, for example, be circular, rectangular, in the shape of any polygon, oval or elliptical. However, preference is given to a circular cross-sectional area.

A reactor for droplet polymerization generally comprises a head with an apparatus for dropletization of a monomer solution, a middle region through which the dropletized monomer solution falls to be converted into polymer, and a fluidized bed into which the polymer droplets fall. The fluidized bed thus caps off the bottom of the region of the reactor in which the hydraulic internal diameter decreases.

In order that the monomer solution exiting the apparatus for dropletization is not sprayed onto the wall of the reactor, and in order at the same time to configure the reactor advantageously both in terms of statics and in terms of material costs, it is preferable to form the head of the reactor in the shape of a frustocone and to position the apparatus for dropletization in the frustoconical head of the reactor.

The frustoconical configuration of the head of the reactor makes it possible to economize on materials compared to a cylindrical configuration. Moreover, a frustoconically configured head improves the static stability of the reactor. A further advantage is that the gas and the droplets of the monomer solution may be better brought into contact with one another. The problem of fouling has the effect that it would not be possible to make the apparatus for dropletization larger even for a cylindrical configuration of the reactor though in this case the cross-sectional area for the gas feed would be substantially larger and a large portion of the gas would therefore require a substantially longer period of time before contact with the droplets takes place and said portion is admixed into the stream comprising the droplets. Further, at a cone aperture angle of more than 7° the gas flow detaches from the surface and forms vortices which in turn contributes to faster commixing.

In order to keep the height of the reactor as low as possible, it is further advantageous when the apparatus for dropletization of the monomer solution is disposed as far upward as possible in the frustoconically configured head. This means that the apparatus for dropletization of the monomer solution is disposed at the height in the frustoconically configured head at which the diameter of the frustoconically configured head is roughly the same as the diameter of the apparatus for dropletization.

In order to prevent the monomer solution which exits the apparatus for dropletization in the region of the outermost holes from being sprayed against the wall of the frustoconically configured head, it is preferable when the hydraulic diameter of the frustoconically configured head, at the height at which the apparatus for dropletization is disposed, is from 2% to 30%, more preferably from 4% to 25%, and more particularly from 5% to 20%, larger than the hydraulic diameter of the area enclosed by a line connecting the outermost holes. The somewhat larger hydraulic diameter of the head additionally ensures that droplets, even below the reactor head, do not prematurely hit the reactor wall and adhere thereto.

Above the apparatus for dropletization of the monomer solution there is an addition point for gas, and gas and droplets therefore flow cocurrently through the reactor from top to bottom. Since the lower region of the reactor comprises the fluidized bed, this has the effect that in the lower region of the reactor gas flows from bottom to top in the opposite direction. Since gas is introduced into the reactor both from the top and from the bottom, the gas needs to be withdrawn between the apparatus for dropletization of the monomer solution and the fluidized bed. It is preferable when the gas withdrawal point is positioned at the transition between the cylindrical wall of the reactor and the region having a decreasing hydraulic internal diameter. The corresponding widening in the cross section to the maximum reactor diameter at the height of the gas withdrawal point prevents particle entrainment into the reactor offgas. The gas withdrawal ring has a cross-sectional area such that the average gas velocity in the ring is from 0.25 to 3 m/s, preferably from 0.5 to 2.5 m/s, and more particularly from 1.0 to 1.8 m/s. While smaller values do reduce particle entrainment, they also result in uneconomically large dimensions while larger values lead to an undesirably high level of particle entrainment.

The region of the reactor where the gas withdrawal point is positioned preferably has a configuration such that the diameter of the region having a decreasing hydraulic internal diameter is larger at the upper end thereof than the diameter of the upper section of the reactor. The gas flowing through the reactor from the top flows around the lower end of the reactor wall of the upper section and is withdrawn via at least one gas takeoff from the annular space formed between the upper end of the region having a decreasing hydraulic internal diameter and the lower end of the reactor wall that projects into the region having a decreasing hydraulic internal diameter. Connected to the gas takeoff is an apparatus for removing solids, in which polymer particles which are drawn off from the reactor with the gas flow can be removed. Suitable apparatuses for removing solids are, for example, filters or centrifugal separators, for example cyclones. Particular preference is given to cyclones.

According to the invention, the hydraulic diameter of the fluidized bed is chosen such that the surface of the fluidized bed is at least sufficiently large that a droplet falling vertically downward from the outermost holes of the apparatus for dropletization falls into the fluidized bed. To this end, the surface of the fluidized bed is at least just as large, and just the same shape, as the area formed by a line connecting the outermost holes of the apparatus for dropletization. It is furthermore also possible for the surface of the fluidized bed to be larger than the area formed by the line connecting the outermost holes of the apparatus for dropletization. It is particularly preferable when the surface of the fluidized bed is from 5% to 50%, more preferably from 10% to 40%, and more particularly from 15% to 35%, larger than the area formed by the line connecting the outermost holes of the apparatus for dropletization. Here, the shape of the surface of the fluidized bed is the same in each case as the shape of the area enclosed by the line connecting the outermost holes. When, for example, the surface of the fluidized bed is circular, the area enclosed by the line connecting the outermost holes is also circular while the diameter of the surface of the fluidized bed may be larger than the diameter of the area formed by the line connecting the outermost holes of the apparatus for dropletization.

Typically, the monomer solution exits from the holes of the apparatus for dropletization in the form of a liquid jet which then breaks up into droplets in the reactor. The breakup of the liquid jet depends on the amount of the liquid exiting through the holes per unit time and also on the velocity and amount of the gas flowing through the reactor. The properties of the monomer solution and the geometry of the holes also affect the type of jet breakup. In the context of present invention, droplet breakup is also referred to as dropletization.

In order that enough gas can flow past the apparatus for dropletization of the monomer solution, so a uniform gas velocity in the reactor can be achieved and there is no excessive acceleration and vortexing of the gas as it flows around the apparatus, it is further preferable when the ratio of the area covered by the apparatus for dropletization in the reactor relative to the area enclosed by the line connecting the outermost holes is less than 50% and preferably in the range between 3% and 30%.

It is further preferable when the number of holes relative to the area formed by the line connecting the outermost holes is in the range of from 100 to 1000 holes/m$^2$, preferably in the range of from 150 to 800 holes/m$^2$ and more particularly in the range of from 200 to 500 holes/m$^2$. This ensures that there is a sufficient distance between the droplets formed at the holes and that said droplets can additionally come into sufficient contact with the gas flowing through the reactor.

In one embodiment, the apparatus for dropletization of the monomer solution comprises channels which have holes in the bottom thereof and which are arranged in a star shape. The star-shaped arrangement of the channels makes it possible, especially in a reactor having a circular cross section, to obtain a uniform distribution of the droplets in the reactor. Addition is effected via the channels into which the monomer solution is introduced. The liquid exits through the holes in the bottom of the channels and forms the droplets.

In order that the droplets exiting from the channels come into contact as quickly as possible with the gas flowing around the channels, it is further preferable when the channels have as narrow a width as possible. The width of the channels is preferably in the range of from 25 to 500 mm, more preferably in the range of from 100 to 400 mm, and more particularly in the range of from 150 to 350 mm.

In one preferred embodiment the heating means in the region of the reactor having a steadily decreasing hydraulic internal diameter has a configuration such that said heating means supplies a heat output in the range of from 20 to 5000 W/m$^2$. It is preferable when the heat output is in the range of from 100 to 3000 W/m$^2$ and more particularly in the range of from 200 to 1500 W/m$^2$. A heat output of below 20 W/m$^2$ is insufficient to avoid encrustations while a heat output of above 5000 W/m$^2$ leads to irreversible damage to the material hitting the wall of the reactor and thus to inferior product quality.

Heating may be achieved via any desired heating device known to those skilled in the art. For instance, heating may be effected using an electric heater. Heating may alternatively be achieved via, for example, direct firing, for example with gas or oil. However, it is preferable when the shell for heating is a double shell or takes the form of heating coils applied to the outside of the shell, wherein a heating medium flows through the double shell or the heating coils. Examples of suitable heating media include thermal oil, water or steam. Heating with steam is particularly preferred.

When heating is effected using heating coils applied to the shell of the reactor, said coils are preferably serpentine heating coils to ensure that the heating coils supply heat uniformly.

The region of the reactor having a steadily decreasing hydraulic internal diameter may have any desired shape, it being particularly preferable when the region having a steadily decreasing hydraulic internal diameter is conical. The conical shape has the advantage that polymer particles formed from the droplets during their fall by polymerization of the monomer solution can fall into the fluidized bed without being sucked out of the reactor along with the offgas. Polymer particles directly striking the region having a steadily decreasing hydraulic internal diameter can slide into the fluidized bed.

In order to promote the sliding of the polymer particles on the wall of the region of the reactor having a steadily decreasing hydraulic internal diameter, it is possible to affix mechanical or pneumatic cleaning apparatuses to the exterior of the reactor in the region having a steadily decreasing hydraulic internal diameter. Since encrustations occur particularly in the lower region of the reactor, though said encrustations may also occur above the region having a steadily decreasing hydraulic internal diameter, it is preferable when, in addition, there are mechanical or pneumatic cleaning apparatuses affixed to the exterior of the reactor in the lower third of the region of the shell having a constant hydraulic internal diameter.

Suitable mechanical or pneumatic cleaning apparatuses are, for example, tappers. Alternatively to tappers, however, it is also possible to employ, for example, vibration- or ultrasound-imparting means, moveable scrapers or stirring means and also gas nozzles as mechanical or pneumatic cleaning apparatuses. The reactor wall may further be treated or coated with suitable anti-adhesives such as PTFE, polyamide, polyurethane or silicone or may even be made entirely of such materials.

Working examples of the invention are shown in the figures and are more particularly described in the description which follows.

FIG. 1 shows a longitudinal section through a reactor configured according to the invention.

Figure 1:
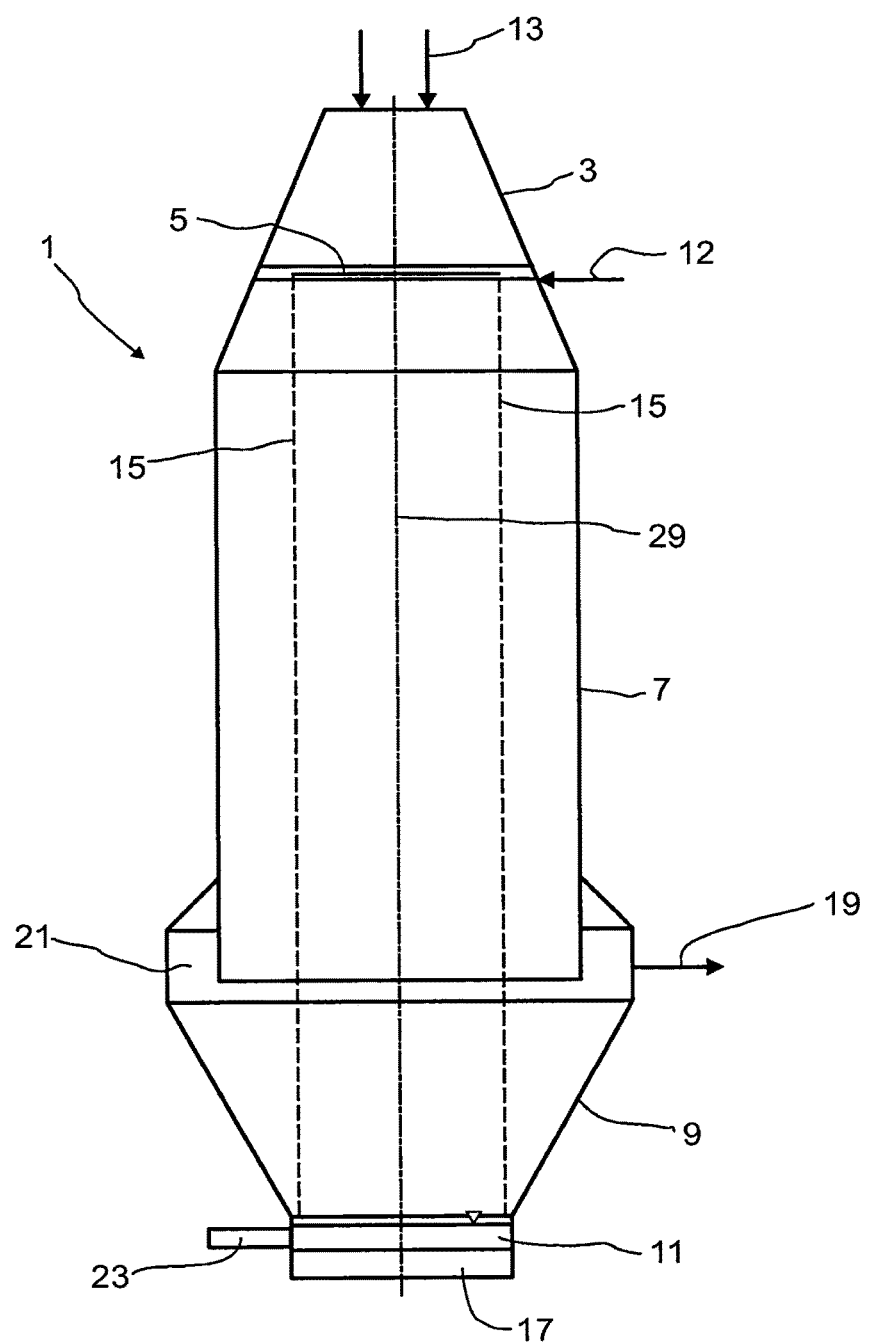
FIG. 1 is a longitudinal section through a reactor for droplet polymerization.

A reactor 1 for droplet polymerization comprises a reactor head 3 in which an apparatus for dropletization 5 is accommodated, a middle region 7 in which the polymerization reaction is performed, and a lower region 9 comprising a fluidized bed 11 in which the reaction is concluded.

The polymerization reaction for producing the poly(meth)acrylate is carried out by supplying the apparatus for dropletization 5 with a monomer solution via a monomer feed 12. When the apparatus for dropletization 5 has two or more channels, it is preferable to supply each channel with the monomer solution via a dedicated monomer feed 12. The monomer solution exits through holes, not shown in FIG. 1, in the apparatus for dropletization 5 and breaks up into individual droplets which fall downward in the reactor. A gas, for example nitrogen or air, is introduced into the reactor 1 via a first addition point for a gas 13 above the apparatus for dropletization 5. This gas flow assists the breakup into individual droplets of the monomer solution exiting from the holes in the apparatus for dropletization 5. In addition, the gas flow helps to prevent the individual droplets from touching and coalescing to form larger droplets.

In order to make the cylindrical middle region 7 of the reactor as short as possible and also to avoid droplets hitting the wall of the reactor 1, the reactor head 3 preferably has a conical configuration as shown here, the apparatus for dropletization 5 being disposed within the conical reactor head 3 above the cylindrical region. However, it is also possible as an alternative to provide the reactor with a cylindrical configuration in the reactor head 3 as well, with a diameter the same as that of the middle region 7. However, a conical configuration of the reactor head 3 is preferred. The position of the apparatus for dropletization 5 is chosen such that there is still a sufficiently large distance between the outermost holes through which the monomer solution is supplied and the wall of the reactor to prevent the droplets from hitting the wall. To this end, the distance should be at least in the range of from 50 to 1500 mm, preferably in the range of from 100 to 1250 mm and more particularly in the range from 200 to 750 mm. It will be appreciated that a greater distance from the wall of the reactor is also possible. However, a corollary of greater distance is poorer utilization of the reactor cross section.

The lower region 9 is capped off with a fluidized bed 11 and the polymer particles formed from the monomer droplets during the fall, fall into said fluidized bed. The post reaction to afford the desired product is performed in the fluidized bed. According to the invention the outermost holes through which the monomer solution is dropletized are positioned such that a droplet falling vertically downward falls into the fluidized bed 11. This can be achieved, for example, by virtue of the hydraulic diameter of the fluidized bed being at least as large as the hydraulic diameter of the area which is enclosed by a line connecting the outermost holes in the apparatus for dropletization 5, the cross-sectional area of the fluidized bed and the area formed by the line connecting the outermost holes having the same shape and the centers of the two areas being at the same position in a vertical projection of one onto the other. The outermost position of the outer holes relative to the position of the fluidized bed 11 is shown in FIG. 1 using a dotted line 15.

In order furthermore to avoid droplets hitting the wall of the reactor in the middle region 7 as well, the hydraulic diameter at the height of the midpoint between the apparatus for dropletization and the gas withdrawal point is at least 10% larger than the hydraulic diameter of the fluidized bed.

The reactor 1 may have any desired cross-sectional shape. However, the cross section of the reactor 1 is preferably circular. In this case, the hydraulic diameter is the same as the diameter of the reactor 1.

Above the fluidized bed 11, the diameter of the reactor 1 increases in the embodiment shown here and the reactor 1 therefore widens conically from bottom to top in the lower region 9. This has the advantage that polymer particles that are formed in the reactor 1 and that hit the wall can slide downward along the wall and into the fluidized bed 11. To avoid encrustations, it is additionally possible to provide tappers, not shown here, on the outside of the conical section of the reactor, said tappers being used to set the wall of the reactor into vibration which causes adhering polymer particles to become detached and slide into the fluidized bed 11.

To effect gas feeding for the operation of the fluidized bed 11, a gas distributor 17 below the fluidized bed 11 blows the gas into the fluidized bed 11.

Since gas is introduced into the reactor 1 both from the top and from the bottom, it is necessary to withdraw gas from the reactor 1 at a suitable position. To this end, at least one gas withdrawal point 19 is disposed at the transition between the middle region 7 having a constant cross section and the lower region 9 which widens conically from the bottom upward. Here, the wall of the cylindrical middle region 7 projects into the lower region 9 which widens conically in an upward direction, the diameter of the conical lower region 9 at this position being larger than the diameter of the middle region 7. Thus an annular chamber 21, which encircles the wall of the middle region 7, is formed, into which the gas flows and can be drawn off through the at least one gas withdrawal point 19 connected to the annular chamber 21.

The post reacted polymer particles of the fluidized bed 11 are withdrawn via a product withdrawal point 23 in the region of the fluidized bed.

Figure 2:
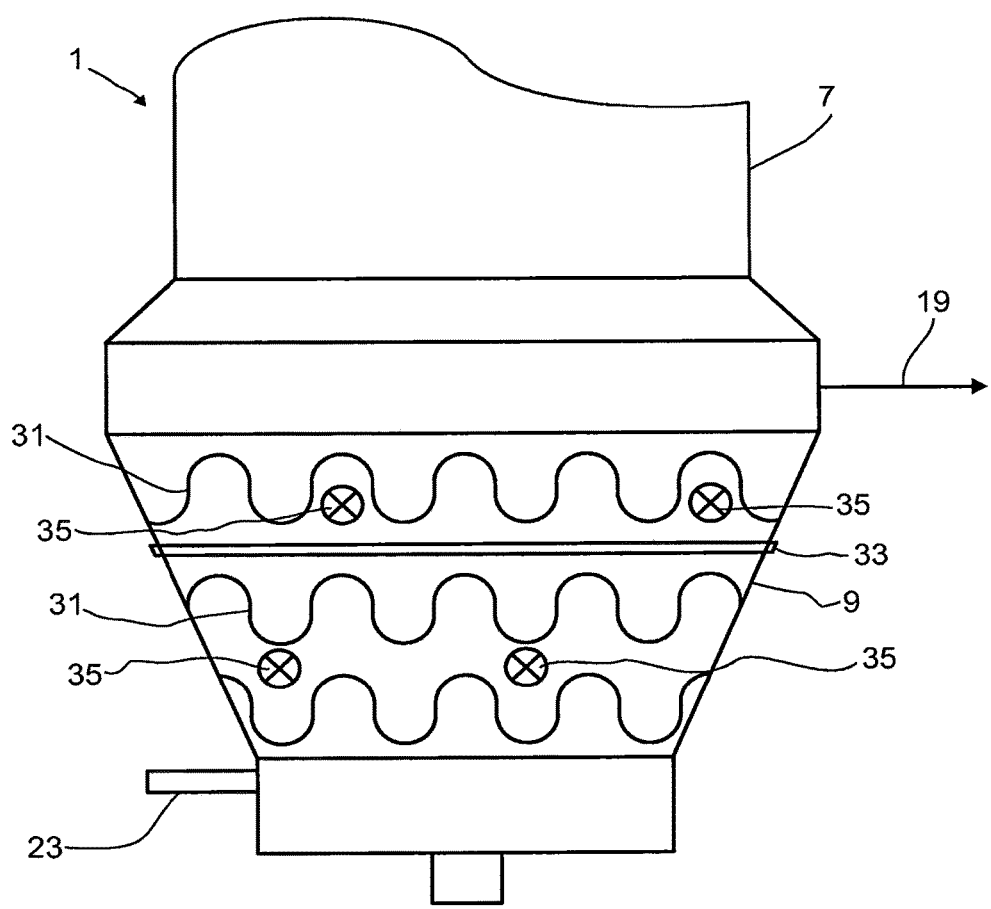
FIG. 2 is a schematic diagram of the region having a steadily decreasing hydraulic internal diameter with heating coils and tappers.

FIG. 2 is a schematic diagram of the region having a steadily decreasing hydraulic internal diameter with heating coils and tappers.

In order to achieve heating of the conical lower region 9 it is possible, for example, to apply heating coils 31 to the outside of the conical lower region 9. In order to heat the reactor wall of the lower conical region 9, the heating coils 31 have a heat-transfer medium flowing therethrough, for example thermal oil, water or, preferably, steam. As an alternative to heating coils 31 applied to the conical lower region 9 which have a heat-transfer medium flowing therethrough, it is also possible to provide an electrical heating means for example.

When heating coils 31 having a heat-transfer medium flowing therethrough are employed, the temperature and volume flow are set such that a heat output in the range of from 20 to 5000 W/m$^2$ is supplied to the lower conical region 9 of the reactor 1.

In order to stabilize the wall of the lower conical region 9 it is possible to apply reinforcing rings 33 to the wall. The arrangement of these reinforcing rings 33 and the heating coils 31 is such that the reinforcing rings 33 do not impede the supply of heat to the lower conical region 9 of the reactor 1.

In order to prevent encrustations and in complement to the heating of the lower conical region 9, mechanical or pneumatic cleaning apparatuses, for example tappers 35, may additionally be affixed. Here, the tappers 35 are positioned between the heating coils 31 in order that they may act directly upon the wall of the lower conical region 9.

EXAMPLES

The production of poly(meth)acrylate is carried out using a reactor for droplet polymerization of the type shown in FIG. 1. The region of the reactor having a constant diameter has a height of 22 m and a diameter of 3.4 m. The fluidized bed has a diameter of 3 m and a height of 0.25 m.

Nitrogen having a residual oxygen fraction of from 1 to 4 vol % was supplied at the top of the reactor as drying gas. The amount of drying gas was set such that the gas velocity in the cylindrical section of the reactor was 0.8 m/s. The temperature was measured at the product outlet and maintained at 117° C. during operation of the reactor by adjusting the temperature of the drying gas.

The supplied gas for generating the fluidized bed had a temperature of 122° C. and a relative humidity of 4%. The gas velocity in the fluidized bed was 0.8 m/s and the residence time of the product in the fluidized bed was 120 min. The product was withdrawn from the reactor via a cellular wheel lock and supplied to a moving bed of 3 m in length, 0.65 m in width and 0.5 m in height. The gas supplied to the moving bed had a temperature of 60° C. and the amount of gas was set such that the gas velocity in the moving bed was 0.8 m/s. The gas employed was air. The residence time of the product in the moving bed was 1 min. The product withdrawn from the moving bed was finally sieved to remove particles having a particle diameter of more than 800 μm.

To produce the monomer solution supplied to the reactor, acrylic acid was mixed initially with 3-tuply ethoxylated glyerol triacetate as crosslinker and subsequently with a 37.3 wt % sodium acrylate solution. The monomer solution was brought to a temperature of 10° C. Admixed therewith as initiators using a static mixer, prior to addition of the monomer solution into the reactor, were sodium persulfate solution at a temperature of 20° C. and 2,2'-azobis[2-(2-imidazolin-2-yl)propane]dihydrochloride along with Bruggolite® FF7 at a temperature of 5° C. Addition into the reactor was effected via 3 channels with dropletizer casettes each sealed at the bottom with a dropletizer plate having 256 bores of 170 μm in diameter and a distance between bores of 15 mm.

The dropletizer casettes were brought to a temperature of 8° C. using water flowing through the channels encircling the dropletizer casettes.

The dropletizer plates were angled about their central axis at an angle of 3° to the horizontal. The material used for the dropletizer plates was stainless steel. The dropletizer plates were of 630 mm in length, 128 mm in width and 1 mm in height.

The monomer solution supplied to the reactor comprised 10.45% of acrylic acid, 33.40 wt % of sodium acrylate, 0.018 wt % of 3-tuply ethoxylated glycerol triacetate, 0.072 wt % of 2,2'-azobis[2-(2-imidazolin-2-yl)propane]dihydrochloride, 0.0029 wt % of a 5 wt % solution of Bruggolite® FF7 in water, 0.054 wt % of a 15 wt % solution of sodium persulfate in water, and water. The monomer solution was supplied to the reactor at a rate of 1.6 kg/h per bore.

The lower conical region of the reactor had an area of 24.75 m² and a wall thickness of 5 mm. The lower region was heated electrically. In addition, there were 6 Netter PKL 2100/5 pneumatic tappers mounted to the lower conical region. Each tapper was actuated such that it generated two impacts with a gap of 3 s at 50 s intervals.

The product withdrawn from the reactor had a bulk density of 680 g/l and an average particle diameter of 407 µm.

Several experiments were performed where the lower conical region was heated with different heat outputs. The heat output and the results are shown in Table 1.

TABLE 1 heat output and results

| Example | Specific heat supplied [W/m²] | Average operating duration before shutdown and results |
|---|---|---|
| 1 | 0 | shutdown and cleaning required after 4.5 hours |
| 2 | 55 | shutdown and cleaning required after 36 hours |
| 3 | 240 | shutdown and cleaning required after 9 hours |
| 4 | 1200 | operating time of more than 14 days, controlled fouling |
| 5 | 3750 | operating time of more than 14 days, controlled fouling, increased yellowing of product |

As is apparent from Table 1, operating duration increases with increasing heat output. Particularly when low heat outputs are used, fouling occurs which requires that the process be brought to an end to clean the reactor. As is apparent from the table, even a low heat output results in a marked increase in operating duration compared to operation without heating of the lower conical region.

However, a heat output which is too high does not result in an increase in operating duration but rather results in a decrease in product quality which manifested itself as yellowing of the product in Example 5.

LIST OF REFERENCE NUMERALS 1 reactor
3 reactor head
5 apparatus for dropletization
7 middle region
9 lower region
11 fluidized bed
12 monomer feed
13 addition point for gas
15 position of the outermost holes in relation to the fluidized bed 11
17 gas distributor
19 gas withdrawal point
21 annular chamber
23 product withdrawal point
29 reactor axis
31 heating coil
33 reinforcing ring
35 tapper

The invention claimed is:

1. An apparatus for producing pulverulent poly(meth)acrylate, comprising a reactor (1) for droplet polymerization comprising an apparatus (5) for dropletization of a monomer solution for the production of the poly(meth)acrylate comprising holes through which the monomer solution is introduced, an addition point (13) for a gas above the apparatus (5) for dropletization, at least one gas withdrawal point (19) on the circumference of the reactor (1) and a fluidized bed (11), wherein above the gas withdrawal point (19) the reactor (1) comprises a region having a constant hydraulic internal diameter and below the gas withdrawal point (19) the reactor has a hydraulic internal diameter that steadily decreases, wherein the reactor (1) comprises a heater (31) in the region having a steadily decreasing hydraulic internal diameter and the heater (31) supplies a heat output in the range of from 20 to 3000 W/m².

2. The apparatus according to claim 1, wherein the heater (31) is an electric heater.

3. The apparatus according to claim 1, wherein the heater (31) is a double shell or takes the form of heating coils (31) applied to the outside of the reactor shell, wherein the double shell or the heating coils (31) have a heating medium flowing therethrough.

4. The apparatus according to claim 1, wherein the region having a steadily decreasing hydraulic internal diameter is conical.

5. The apparatus according to claim 1, wherein in the region having a steadily decreasing hydraulic internal diameter there are mechanical or pneumatic cleaning apparatuses (35) affixed to the exterior of the reactor (1).

6. The apparatus according to claim 5, wherein the mechanical or pneumatic cleaning apparatuses are tappers (35).

7. The apparatus according to claim 1, wherein there are mechanical or pneumatic cleaning apparatuses (35) affixed to the exterior of the reactor in the lower third of the region having a constant hydraulic interior diameter.

8. The apparatus according to claim 7, wherein the mechanical or pneumatic cleaning apparatuses are tappers (35).

9. The apparatus according to claim 5, wherein there are mechanical or pneumatic cleaning apparatuses (35) affixed to the exterior of the reactor in the lower third of the region of the shell having a constant hydraulic interior diameter.

10. The apparatus according to claim 9, wherein the mechanical or pneumatic cleaning apparatuses are tappers (35).

* * * * *